No. 12,099.
REISSUED MAR. 10, 1903.
D. A. SCHUTT.
LAMP SOCKET.
APPLICATION FILED JAN. 23, 1902.
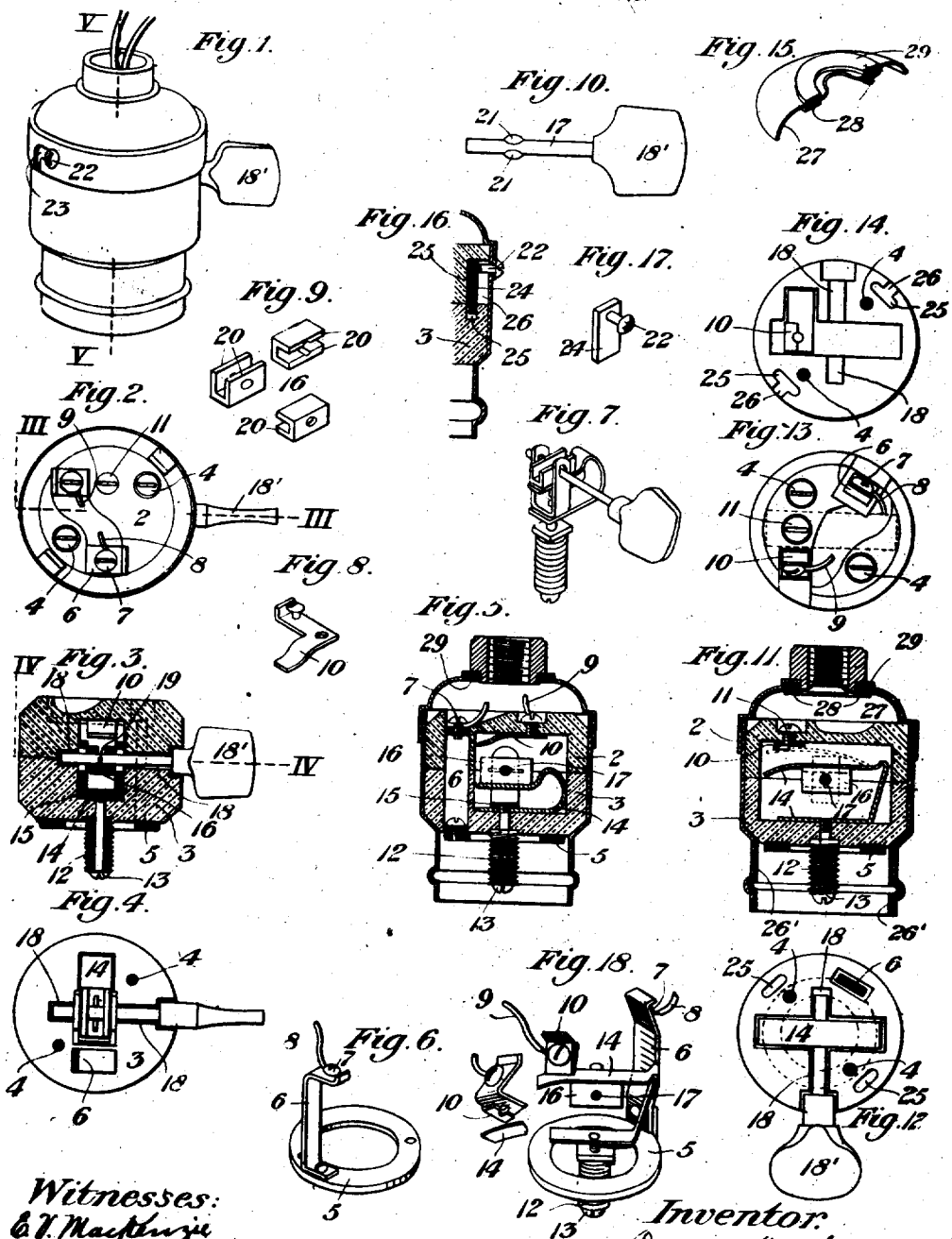
Witnesses:
E. V. Mackenzie
Chas. S. Sepley.
Inventor:
Henry A. Schutt.
by C. M. Clarke
his attorney.

UNITED STATES PATENT OFFICE.

DUNY A. SCHUTT, OF PERU, INDIANA.

LAMP-SOCKET.

SPECIFICATION forming part of Reissued Letters Patent No. 12,099, dated March 10, 1903.

Original No. 681,268, dated August 27, 1901. Application for reissue filed January 23, 1902. Serial No. 90,998.

*To all whom it may concern:*

Be it known that I, DUNY A. SCHUTT, a citizen of the United States, residing in Peru, county of Miami, and State of Indiana, have invented certain new and useful Improvements in Lamp-Sockets, of which the following is a specification, reference being had therein to the accompanying drawings, forming part of this specification.

My invention relates to sockets for incandescent lamps, either key or keyless; and it consists of the novel construction, arrangement, and operation of the various parts, as I shall now proceed to describe.

The principal object of the invention is to provide a socket which will be in itself a perfect insulation with all working parts so arranged that the regulation requirements in "break distance" are complied with and the working parts and mechanism are so arranged that it will open or close circuit quickly, while still having in all parts the required metallic bodies to give the best results or higher voltage.

A further object of the invention is to incorporate the base members with the cap and shell in a simple and efficient manner, by which short-circuiting through these parts is prevented, while the cap is also provided with an internal fiber washer or cap lining by which the entire upper cavity in which the terminal connections are made is thoroughly protected and insulated from the cap.

Figure 1 is a perspective view of my improved socket. Fig. 2 is a plan view of the top of the upper portion of the socket, the cap being removed. Fig. 3 is a vertical section through the upper and lower portions of the socket assembled, indicated by the line III III of Fig. 2, the case being removed. Fig. 4 is a plan view of the lower portion of the socket, the partition-line being indicated at IV IV of Fig. 3. Fig. 5 is a vertical section taken through the entire socket on the line V V of Fig. 1. Fig. 6 is a perspective detail view of the outside connecting-ring with metallic conductor. Fig. 7 is a detail perspective view showing the key, yoke, tumbler-spring, and center contact-post assembled. Fig. 8 is a detail perspective view of the upper contact-spring detached. Fig. 9 shows in perspective three views of the tumbler detached. Fig. 10 is a side elevation of the key detached, showing a modified construction. Fig. 11 is a vertical section similar to Fig. 5, but illustrating certain modifications in construction. Fig. 12 is a plan view of the lower portion of the socket of Fig. 11, the partition-line being indicated at XII XII. Fig. 13 is a plan view of the top of the upper portion of the socket of Fig. 11, the case being removed. Fig. 14 is an under plan view of the upper portion of the socket of Fig. 11. Fig. 15 is a detail perspective view of the fiber lining of the cap, showing how the same is fastened to the cap. Fig. 16 is a sectional detail view through a portion of each member of the socket-base at the side, showing the manner in which the shell and cap are held together and to the base members. Fig. 17 is a perspective detail view of the retaining piece or nut inserted in the slotted openings in the socket members and by which the telescoping ends of the inclosing cap and shell are held together and to the socket members. Fig. 18 is a perspective detail view of the terminal member and the contacting devices.

Referring now to the drawings, the body portion of the socket is composed of upper and lower base members 2 3, of porcelain or other suitable insulating material, held together with screws 4 4, passing through both members, tapping into the outside connecting-ring 5 and holding it in position. This ring is connected with an upwardly-projecting terminal branch 6, which may be a flat bar, screw, or rod which passes through both members of the socket, and to the top of which by screw 7 one of the terminal wires 8 is connected. The other terminal wire 9 is connected in a similar manner to an arm of contact spring or piece 10, which spring is held in the under side of the upper base member 2 by screw 11. It will be noted that both of these terminal members, to which the hot wires are connected, are of good size, giving full contact, and that they are located remotely from each other and deep down in the porcelain, thereby obviating any danger of short circuit from strands in lamp-cord, &c. The center contact-post 12 is made of a square bar, the upper end of which fits into a corresponding socket in the under side of the porcelain, while the projecting portion is turned down and threaded or left plain, as desired, for insertion in the lamp-base. This post is drilled centrally, and a screw passes up through the post, porcelain, and into the spring 14 or into a yoke 15, which by the screw is clamped tightly down against the spring 14, by either of which means electrical connection is established with the post 12. The spring is turned around over itself and forms a good bearing for the whole face of the tumbler 16, mounted on the key-stem 17. The stem, which is of the usual construction, is mounted in bearings 18, formed in the meeting faces of the base members 2 3, which bearings are made sufficiently accurate to maintain the stem in alinement independent of any auxiliary bearing; but in case it is desired the sides of the yoke 15 may be provided with elongated slots, which will permit of a degree of automatic adjustment when the tumbler is turned.

I prefer the construction shown in Figs. 11, 12, and 18, for the reason that it is simpler, the break distance is increased, and it is more reliable in operation and avoids the danger of short circuits.

The stem is provided with a thumb-piece 18′, and connection with the tumbler may be made by a pin 19, passing through the stem between the sides 20 of the tumbler, thus insuring a turning action, or, as in Fig. 10, I have shown a modified construction of the key-stem, which affords a good connection with the tumbler and is a cheap, strong, and durable arrangement. In this form the stem is stamped or pressed, so as to form two ears or small lugs 21 on the sides, forming, in effect, flanges projecting from the sides of the stem, adapted to enter the space between the sides 20 of the tumbler and to engage it in the manner of the pin already described. As thus constructed it will be seen that contact will be made with spring 10 by turning the stem, when the flat ends of the tumbler will come into contact with the flat springs 10 and 14, establishing a good electrical contact and resting firmly in position, either in a make or break position. It will be seen also that the stem 17 is entirely surrounded and inclosed by the insulating material of the socket-bases, upper and lower, so that any danger of short circuit with the outer shell or any other metallic substance apt to occur in sockets where the working parts are open is prevented. It is to be noted that the insulated thumb-piece 18 projects into the sides of the base, thus further protecting the stem from contact.

The outer shell is attached together and to the base-cap by screws 22, which pass through slotted bayonet-jointed openings 23 in the cap and shell and are tapped onto elongated flat retaining-nuts 24, which are fitted into sockets 25 in the lower and upper base members, the socket in the upper base being provided with a slotted opening 26 for passage of the screw 22. Good results may be had by making the socket and slot in the upper base only, and it will be seen that as thus constructed the screw and nut form a T-shaped holding-anchor which has a firm holding-bearing in the corresponding T-shaped socket in the base member. In this manner these metallic holding devices are situated remote from the interior working parts. They are embedded in the insulating-base and provide a strong, reliable, and simple means for connecting the parts together. By loosening the screw the cap and shell may be removed, while the screw and its nut are retained in position against accidental dislodgment or loss, and this feature will be found to be of great advantage and value in devices of this class, as it entirely avoids the necessity of supplemental insulating mediums, as inner linings, &c. Where the shell embraces the base of the lamp, I insert a fiber lining 26′, which effectually insulates the metal shell from the base, the lining fitting up around the socket-base and conforming to the internal retaining-groove of the shell in the manner shown. A further protection is provided in the upper cavity by means of a fiber cap and up around the under surface of the cap and securely held in place by means of tongues 28 of ring 29, which tongues are passed through the fiber lining and turned up against it, thus securely holding it in position. The ring 29 is firmly incorporated in the inner side of the socket, as clearly shown in Figs. 5 and 11.

The advantages of my invention will be appreciated by those skilled in the art. All danger of short-circuiting is prevented by reason of all of the metal working parts being entirely inclosed in the interior of the insulating-bases, which are hollowed out to provide for their location and operation. The terminals are so constructed as to give good contact-surface. They are remote from each other and are embedded deeply in the porcelain. The faces of the tumbler and of the contact-springs are broad and flat, insuring good contact, while the center post is firmly embedded in the lower side of the base and strongly united to the spring, so as to insure the best possible mechanical and electrical results.

The manner of connecting the base members with the cap and shell and of the fiber lining with the interior face of the cap is a new and useful feature of my invention, which will be appreciated, while the internal fiber lining of the shell insures against short-circuiting at the base of the lamp.

The device is very simple, cheap, and easy to construct and very durable and efficient in operation and has many features of superiority over the general class of lamp-sockets now in use which will commend it to the users of this class of goods.

Having described my invention, what I claim is—

1. In a lamp-socket, the combination of upper and lower base members of insulating material, a contacting ring on the lower base, provided with a current-terminal embedded in the bases, a threaded center post having a base inserted in the lower side of the lower base, a connecting-screw passing centrally through the center post and base into a contact-spring, a contact-spring so connected and in electrical connection with the screw, an upper contact provided with a connecting-terminal embedded in the upper base, and a turning stem and tumbler mounted in bearing-recesses formed in the meeting faces of the base members and adapted to establish electrical communication between the upper terminal and the contact-spring, substantially as set forth.

2. In a lamp-socket, the combination of upper and lower base members of insulating material, a contacting ring on the lower base provided with a current-terminal embedded in the bases, a threaded center post having a base inserted in the lower side of the lower base, a connecting-screw passing centrally through the center post and base into a contact-spring, a contact-spring so connected and in electrical connection with the screw, an upper contact provided with a connecting-terminal embedded in the upper base, a turning stem and tumbler mounted in bearing-recesses formed in the meeting faces of the base members and adapted to establish electrical communication between the upper terminal and the contact-spring, and connecting-screws passing through both base members into the contacting ring and holding the parts together, substantially as set forth.

3. In a lamp-socket, the combination of a base member of insulating material, a threaded center post having one end inserted in the lower side of the base member, a screw passing through the center post and base member, and a contact-spring electrically connected to the screw; substantially as described.

4. In a lamp-socket, provided with one or more base members of insulating material provided with sockets having screw-slots and surrounding overlapping shells; a holding device for the shells consisting of an elongated flat retaining-nut adapted to be inserted in the socket in the base, and a screw passing through bayonet-joint openings in the shell and through the slot, and tapped into the retaining-nut, whereby the shells and bases are firmly connected, substantially as set forth.

5. In a lamp-socket, the combination of an upper base member of insulating material provided with oppositely-disposed vertical sockets on the sides having lateral screw-slots of less width, a lower base member of insulating material, surrounding overlapping shells provided with bayonet-joint openings, flat retaining-nuts mounted in the sockets, and securing-screws passing through the shell and slots and tapped into the retaining-nuts, substantially as set forth.

6. In a lamp-socket, the combination of an upper base member, of insulating material provided with oppositely-disposed vertical sockets in the sides having lateral screw-slots of less width, a lower base member of insulating material provided with corresponding oppositely-disposed closed vertical sockets adapted to form extensions of the upper socket, surrounding overlapping shells provided with bayonet-joint openings, flat retaining-nuts mounted in the sockets, and securing-screws passing through the shells and slot and tapped into the retaining-nuts, substantially as set forth.

7. In a lamp-socket, the combination of upper and lower base members of insulating material, a contacting ring on the lower base provided with a current-terminal embedded in the bases, a threaded center post having a square base inserted in the lower side of the lower base, a connecting-screw passing centrally through the center post and base into a contact-spring, a contact-spring so connected and in electrical connection with the screw, an upper contact provided with a connecting-terminal embedded in the upper base, a turning stem and tumbler mounted in bearing-recesses formed in the meeting faces of the base members and adapted to establish electrical communication between the upper terminal and the contact-spring, surrounding upper and lower overlapping shells, holding devices for the shells consisting of elongated flat retaining-nuts adapted to be inserted in sockets in the base members, and screws passing through bayonet-joint openings in the shells and tapped into the retaining-nuts, substantially as set forth.

8. In a lamp-socket, the combination of upper and lower base members of insulating material, a contacting ring on the lower base provided with a current-terminal, embedded in the bases, a threaded center post having a square base inserted in the lower side of the lower base, a connecting-screw passing centrally through the center post and base into a contact-spring, a contact-spring so connected and in electrical connection with the screw, an upper contact provided with a connecting-terminal embedded in the upper base, a turning stem and tumbler mounted in bearing-recesses formed in the meeting faces of the base members and adapted to establish electrical communication between the upper terminal and the contact-spring, surrounding upper and lower overlapping shells, an internal insulating lining for the upper shell consisting of a cap-shaped disk of fiber conforming to the inner surfaces of the shell and held therein by retaining-lugs passing through the fiber and bent over, holding devices for the shell consisting of elongated flat retaining-nuts adapted to be inserted in sockets in the base members, and screws passing through bayonet-joint openings in the shell and tapped into the retaining-nuts, substantially as set forth.

9. In a lamp-socket, the combination of upper and lower base members of insulating material, a contacting ring on the lower base provided with a current-terminal embedded in the bases, a threaded center post having a square base inserted in the lower side of the lower base, a connecting-screw passing centrally through the center post and base into a contact-spring, a contact-spring so connected and in electrical connection with the screw, an upper contact provided with a connecting-terminal embedded in the upper base, a turning stem and tumbler mounted in bearing-recesses formed in the meeting faces of the base members, and adapted to establish electrical communication between the upper terminal and the contact-spring, surrounding upper and lower overlapping shells, an internal insulating-lining for the upper shell consisting of a cap-shaped disk of fiber conforming to the inner surface of the shell and held therein by retaining-lugs passing through the fiber and bent over, an inner lining for the lower shell of insulating material, holding devices for the shell consisting of elongated flat retaining-nuts adapted to be inserted in sockets in the base members, and screws passing through bayonet-joint openings in the shells and tapped into retaining-nuts, substantially as set forth.

10. In a lamp-socket of the class described an internal insulating-lining for the cap consisting of a cap-shaped disk of fiber conforming to the inner surface of the cap and holding-lugs passing through the fiber and bent over, substantially as set forth.

In testimony whereof I affix my signature in the presence of two witnesses.

DUNY A. SCHUTT.

Witnesses:

WM. B. MCCLINTIC,

DAVID IRWIN.